(12) United States Patent
Aoki et al.

(10) Patent No.: US 9,104,641 B2
(45) Date of Patent: Aug. 11, 2015

(54) INFORMATION PROCESSING DEVICE, METHOD OF PROCESSING INFORMATION AND STORAGE MEDIUM

(75) Inventors: Kenji Aoki, Tokyo (JP); Takayuki Nakata, Tokyo (JP)

(73) Assignee: NEC CORPORATION, Tokyo (JP)

(*) Notice: Subject to any disclaimer, the term of this patent is extended or adjusted under 35 U.S.C. 154(b) by 559 days.

(21) Appl. No.: 13/515,554

(22) PCT Filed: Dec. 7, 2010

(86) PCT No.: PCT/JP2010/072311
§ 371 (c)(1),
(2), (4) Date: Jun. 13, 2012

(87) PCT Pub. No.: WO2011/074509
PCT Pub. Date: Jun. 23, 2011

(65) Prior Publication Data
US 2012/0331024 A1 Dec. 27, 2012

(30) Foreign Application Priority Data
Dec. 15, 2009 (JP) .................. 2009-284304

(51) Int. Cl.
*G06F 17/18* (2006.01)
(52) U.S. Cl.
CPC ..................... *G06F 17/18* (2013.01)
(58) Field of Classification Search
CPC ....................................... G06F 17/18
USPC ........................................ 708/200
See application file for complete search history.

(56) References Cited

U.S. PATENT DOCUMENTS

| 2004/0225478 A1* | 11/2004 | Andoh et al. ............ 702/196 |
| 2006/0187884 A1* | 8/2006 | Ma et al. ............... 370/332 |
| 2013/0324431 A1* | 12/2013 | Szigeti et al. ............ 506/9 |

FOREIGN PATENT DOCUMENTS

| CN | 1412298 A | 4/2003 |
| CN | 101482944 A | 7/2009 |
| JP | 2008-269215 A | 11/2008 |

OTHER PUBLICATIONS

Keita Kinjo, et al., "Extraction of Relational Structure from Time Series Data Using Inductive Logic Programming a Platform for Skillful Motion Analysis", Journal of Japan Society for Fuzzy Theory and Intelligent Informatics, Aug. 15, 2009, vol. 21, No. 4, pp. 587-597, 11 pages total.

(Continued)

*Primary Examiner* — Chuong D Ngo
(74) *Attorney, Agent, or Firm* — Sughrue Mion, PLLC

(57) ABSTRACT

An information processing device calculates a mean and a variance of a response variable for each range determined based on a partition candidate being information on partitioning a domain of an explanatory variable into a plurality of ranges based on observed data and the mean and the variance are dependent on the explanatory variable, selects a specific partition candidate among a plurality of the partition candidates using an information criterion calculated based on the observed data and the calculated mean and variance of the response variable, and calculates a smooth function representing the variance of the response variable in the domain of the explanatory variable and a smooth function representing the mean of the response variable in the domain of the explanatory variable based on the mean and the variance calculated for each range determined based on the specific partition candidate.

12 Claims, 7 Drawing Sheets

(56) References Cited

OTHER PUBLICATIONS

Naohiro Toda, et al., "Polynomial Regression Model with Combination of Power and Its Accuracy of Coefficients Estimation", The Transactions of the Institute of Electronics, Information and Communication Engineers, Oct. 25, 1989, vol. J72-A, No. 10, pp. 1556-1562.

PCT/ISA/237 Form.
International Search Report for PCT/JP2010/072311 dated Jan. 18, 2011.
Bishop C M et al., "Pattern Recognition and Machine Learning", p. 138-140, 152-156, and 216-217.
Office Action dated May 30, 2014, issued by the State Intellectual Property Office of People's Republic of China, in counterpart Application No. 201080056544.

* cited by examiner

– 1 –
INFORMATION PROCESSING DEVICE, METHOD OF PROCESSING INFORMATION AND STORAGE MEDIUM

CROSS REFERENCE TO RELATED APPLICATIONS

This application is a National Stage of International Application No. PCT/JP2010/072311 filed Dec. 7, 2010, claiming priority based on Japanese Patent Application No. 2009-284304 filed Dec. 15, 2009, the contents of all of which are incorporated herein by reference in their entirety.

TECHNICAL FIELD

The present invention relates to an information processing device, a method of processing information and a storage medium, which estimate a mean and a variance of a response variable in an case that an explanatory variable is given.

BACKGROUND ART

There is a method of analyzing a degree (dependence) of how a random variable y depends on another random variable x by using a regression model in an case that the random variable y is assumed to depend on the random variable x. This method is called regression analysis. In regression analysis, the random variable y is called a response variable or a dependent variable. The random variable x is called an explanatory variable or an independent variable.

An example of regression analysis is described in a non-patent literature 1. The regression analysis in the non-patent literature 1 is executed under a condition where a variance of a response variable y is assumed to be constant not depending on a value of an explanatory variable x. In other words, the regression analysis in the non-patent literature 1 is executed under a condition where a variance of a response variable is assumed to be homogeneity in a domain of an explanatory variable.

Further, in a case that both of a mean and a variance of a random variable y are assumed to depend on an observed time t of observing a response variable y, there is a method of analyzing the dependence (degree of how the random variable y depends on another random variable x) by using a general state space model. The general state spatial model is a model which expresses dependence of both the mean and the variance of the response variable y by utilizing time-series data where both of the mean and the variance of the response variable y depend on the observed time t. An example of this analysis is described in a non-patent literature 2.

CITATION LIST

Non Patent Literature

[NPL1]
S. Konishi & G. Kitagawa: "Information Criterion, Series; Science of Prediction and Discovery", Asakura Publishing Co., Ltd., pp. 16-22 and 35-37 (Sep. 25, 2004)
[NPL2]
S. Morishita & S. Miyano: "bit, separate volume; Discovery and Data Mining" and KYORITSU SHUPPAN Co., LTD., pp. 159-168 (May 5, 2000)

SUMMARY OF INVENTION

Technical Problem

In the technology described in the non-patent literature 1, both the mean and the variance of the response variable are assumed to be homogeneity in the domain of the explanatory variable. Therefore, in the case that both the mean and the variance of the response variable are dependent on the explanatory variable, the technology of the non-patent literature 1 cannot estimate the mean and the variance of the response variable. In other words, the technology of the non-patent literature 1 has a problem in which it cannot obtain an accurate result of the regression analysis.

On the other hand, in the technology described in the non-patent literature 2, the regression analysis is executed in a case where discrete time-series data observed at each time determined in advance is assigned as a value of the explanatory variable. Therefore, the technology of the non-patent literature 2 cannot estimate either of the mean and the variance of the response variable in a case where the mean and the variance of the response variable are dependent on the explanatory variable taking a continuous value. In other words, the technology of non-patent document 2 has a problem in that it cannot obtain an accurate result of regression analysis.

A main objective of the present invention is to provide an information processing device, a method of processing information and a storage medium which solve the above-described problem.

Solution to Problem

An information processing device, including:
a parameter estimation block that calculates a mean and a variance of a response variable for each range which is determined based on a partition candidate being information on partitioning a domain of an explanatory variable into a plurality of ranges based on observed data including information representing the explanatory variable and information representing the response variable being an observed value in terms of the explanatory variable and the mean and the variance are dependent on the explanatory variable;
an optimum partition specification block that selects a specific partition candidate among a plurality of the partition candidates by using an information criterion which is calculated based on the observed data and the calculated mean and variance of the response variable; and
a smoothing block that calculates a smooth function representing the variance of the response variable in the domain of the explanatory variable and a smooth function representing the mean of the response variable in the domain of the explanatory variable based on the mean and the variance calculated for each range determined based on the specific partition candidate.

A method of processing information, including:
calculating a mean and a variance of a response variable for each range which is determined based on a partition candidate being information on partitioning a domain of an explanatory variable into a plurality of ranges based on observed data including information representing the explanatory variable and information representing the response variable being an observed value in terms of the explanatory variable and the mean and the variance are dependent on the explanatory variable;
selecting a specific partition candidate among a plurality of the partition candidates by using an information criterion which is calculated based on the observed data and the calculated mean and variance of the response variable; and
calculating a smooth function representing the variance of the response variable in the domain of the explanatory variable and a smooth function representing the mean of the response variable in the domain of the explanatory variable based on the mean and the variance calculated for each range determined based on the specific partition candidate.

A storage medium that stores a computer program to enable a computer to execute a process, the process including:

a parameter estimation process that calculates a mean and a variance of a response variable for each range which is determined based on a partition candidate being information on partitioning a domain of an explanatory variable into a plurality of ranges based on observed data including information representing the explanatory variable and information representing the response variable being an observed value in terms of the explanatory variable and the mean and the variance are dependent on the explanatory variable;

an optimum partition specification process that selects a specific partition candidate among a plurality of the partition candidates by using an information criterion which is calculated based on the observed data and the calculated mean and variance of the response variable; and a smoothing process that calculates a smooth function representing the variance of the response variable in the domain of the explanatory variable and a smooth function representing the mean of the response variable in the domain of the explanatory variable based on the mean and the variance calculated for each range determined based on the specific partition candidate.

Advantageous Effects of Invention

According to the present invention, an accurate result of regression analysis can be obtained even in a case that a mean and a variance of a response variable are dependent on an explanatory variable which is a continuous value.

DESCRIPTION OF EMBODIMENTS

Next, exemplary embodiments according to the present invention will be described in detail with reference to drawings.

Before describing an exemplary embodiment according to the present invention, description will give a method of estimating a parameter of a regression model in a general regression model.

In a case that n pieces of observed data which is a combination of a response variable y and an explanatory variable x are respectively represented as $(y_\alpha, x_\alpha)$, degree (dependence) of how the $y_\alpha$ depends on the $x_\alpha$ is expressed by a mathematical formula 1 in a regression model. Where, $\alpha$ represents an integer which is greater than or equal to one and is less than or equal to the n. $u(x_\alpha; w)$ represents a regression function. The w represents a parameter of the regression function. The $\epsilon_\alpha$ represents an error term.

$$y_\alpha = u(x_\alpha; w) + \epsilon_\alpha \qquad \text{[Mathematical Formula 1]}$$

In the regression model, it is generally assumed that the error term $\epsilon_\alpha$ is dependent on that a mean is 0 (zero) and that normal distribution of a variance $\sigma^2$ is $N(0,\sigma^2)$ independently of each other. In this case, if an explanatory variable X is expressed as $X=(x_1, \ldots, x_n)'$, a probability density function f of a response variable $y_{1:n}=(y_1, \ldots, y_n)'$ is expressed by a mathematical formula 2.

$$f(y_{1:n} \mid X; w, \sigma^2) = \prod_{\alpha=1}^{n} \frac{1}{\sqrt{2\pi\sigma^2}} \exp\left\{-\frac{(y_\alpha - u(x_\alpha; w))^2}{2\sigma^2}\right\}$$

[Mathematical Formula 2]

Maximum likelihood estimation is mentioned as a method of estimating a parameter $(w', \sigma^2)'$ of the regression model from observed data. In the maximum likelihood estimation, a parameter value giving the maximum value for a logarithm of the probability density function f, that is, for a log likelihood function log f expressed by a mathematical formula 3, is an objective estimated value.

$$\log f(y_{1:n} \mid X; w, \sigma^2) \qquad \text{[Mathematical Formula 3]}$$

In the following, exemplary embodiments according to the present invention will be described in detail. In addition, in a description of each exemplary embodiment described below, an identical sign is given to components provided with a similar function.

(First Exemplary Embodiment)

Figure 1:
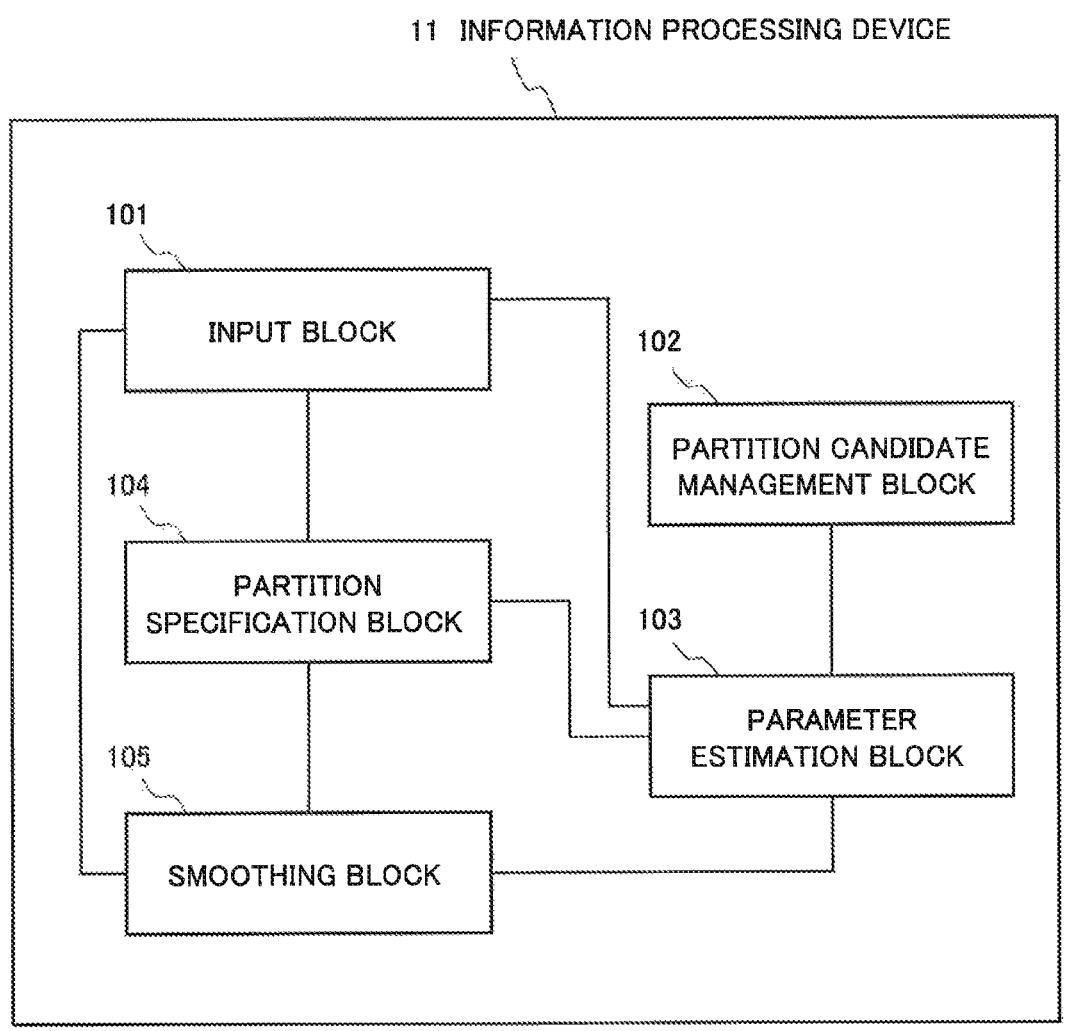
FIG. 1 is a block diagram showing a configuration of an information processing device in a first exemplary embodiment according to the present invention.

FIG. 1 is a block diagram showing a configuration of a first exemplary embodiment according to the present invention.

According to FIG. 1, an information processing device 11 of the first exemplary embodiment according to the present invention includes an input block 101, a partition candidate management block 102, a parameter estimation block 103, an optimum partition specification block 104 and a smoothing block 105.

The input block 101 connects with the parameter estimation block 103, the optimum partition specification block 104 and the smoothing block 105. The partition candidate management block 102 connects with the parameter estimation block 103. The parameter estimation block 103 connects with the input block 101, the partition candidate management block 102, the optimum partition specification block 104 and the smoothing block 105. The optimum partition specification block 104 connects with the input block 101, the parameter estimation block 103 and the smoothing block 105. The smoothing block 105 connects with the input block 101, the parameter estimation block 103 and the optimum partition specification block 104.

===Input Block 101===

When n pieces of the observed data $(y_\alpha, x_\alpha)$ which is a combination of the response variable y and the explanatory variable x, are inputted, the input block 101 receives the observed data. Where the $\alpha$ is an integer which is greater than or equal to one and is less than or equal to n. In the first exemplary embodiment, the explanatory variable x is assumed to be a p-dimensional vector $x=(x^{(1)}, \ldots, x^{(p)})'$.

Where the p is an integer equal to or larger than one. Further, this assumption is an example, and the explanatory variable x may be a scalar value.

In addition, the input block 101 includes an interface circuit which inputs and outputs data. Further, the input block for receiving the observed data $(y_\alpha, x_\alpha)$ may be a sensor input device or a communication device which detect and receive the observed data $(y_\alpha, x_\alpha)$ generated continuously.

===Partition Candidate Management Block 102===

The partition candidate management block 102 stores in a memory a partition candidate which is information on partitioning a domain R of the explanatory variable x into a plurality of ranges.

The partition candidate management block 102 includes a first computing circuit. The first computing circuit calculates the partition candidate based on information representing the domain R of the explanatory variable x, a maximum value M for the number of partitions in the case that the domain R is partitioned and the minimum unit $\Delta x$ of the range in the domain R. The partition candidate management block 102 may be provided with a function to store a result calculated by the first computing circuit in a memory. The maximum value M for the number of partitions is an integer equal to or larger than two. In the case that the explanatory variable x is a p-dimensional vector, the minimum unit $\Delta x$ is represented as $x=(\Delta x^{(1)}, \ldots, \Delta x^{(p)})'$. For example, if the explanatory variable x is an angle, the minimum unit $\Delta x$ takes a value such as 1 degree or 5 degrees.

In the partition candidate management block 102, the domain R, the maximum value M and the minimum unit $\Delta x$ may be provided in advance by a user of the information processing device 11. Alternatively, the partition candidate management block 102 may receive from others information representing respectively the domain R, the maximum value M and the minimum unit $\Delta x$. Further alternatively, the partition candidate management block 102 may receive via the input block 101 the domain R, the maximum value M and the minimum unit $\Delta x$. In any of the cases, the first computing circuit of the partition candidate management block 102 calculates a partition candidate $R_c$ of the domain R based on the information representing respectively the domain R, the maximum value M and the minimum unit $\Delta x$.

Here, the partition candidate $R_c$ will be described.

The partition candidate $R_c$ represents partition of the domain R which can be expressed by a space described below. The space is a space for which the number of partitions (the number with which the domain R is partitioned) is equal to or smaller than M and a boundary surface of each range is a position that each component of the minimum unit $\Delta x$ is multiplied by a constant value. If each the range determined based on the partition candidate $R_c$ is supposed to be represented by $r_i^{(c)}$, each partition candidate $R_c$ in the domain R is expressed by a mathematical formula 4. Where the i in the $r_i^{(c)}$ is an integer which is greater than or equal to one and is less than or equal to $m^{(c)}$. C is the number of partition candidates in the domain R. The $m^{(c)}$ and M satisfy a condition $m^{(c)} \leq M$. Where the c is an integer which is greater than or equal to one and is less than or equal to C.

$$R_c = \bigcup_{i=1}^{m^{(c)}} r_i^{(c)} (c = 1, \ldots, C)$$

[Mathematical Formula 4]

For example, in the case that the explanatory variable x is an angle and the minimum unit $\Delta x$ is 5 degrees, an angle bound of each range $r_i^{(c)}$ is an integral multiple of the minimum unit $\Delta x$, that is, is a multiple of 5.

Further, the partition candidate management block 102 relates the partition candidate $R_c$ with information representing each range $r_i^{(c)}$ determined based on the partition candidate $R_c$ and stores them in the memory.

===Parameter Estimation Block 103===

The parameter estimation block 103 reads the partition candidates $R_c$ of the domain R from the partition candidate management block 102. Then, the parameter estimation block 103 calculates an estimated value for each of the mean and the variance of the response variable y, for each range $r_i^{(c)}$ included in each partition candidate $R_c$. Specifically, the parameter estimation block 103 includes a second computing circuit. The second computing circuit calculates the estimated value for each of the mean and the variance of the response variable y, for each range $r_i^{(c)}$ based on the observed data $(y_\alpha, x_\alpha)$ received by the input block 101 and each partition candidate $R_c$ of the domain R.

In a case that the mean and the variance of the response variable y in each range $r_i^{(c)}$ is assumed as constant values, the second computing circuit calculates the estimated value for each of them by maximum likelihood estimation.

In the regression model in the first exemplary embodiment, in a case that the explanatory variable $X=(x_1, \ldots, x_n)'$ is given in a certain partition candidate $R_c$, a probability density function $f_c$ of the response variable $y_{1:n}=(y_1, \ldots, y_n)'$ is expressed as in a following mathematical formula 5.

[Mathematical Formula 5]

$$f_c\left(y_{1:n} \mid X, \bigcup_{i=1}^{m^{(c)}} r_i^{(c)}; \mu^{(c)}, (\sigma^{(c)})^2\right) =$$

$$\prod_{i=1}^{m^{(c)}} \prod_{x_\alpha \in r_i^{(c)}} \frac{1}{\sqrt{2\pi(\sigma_i^{(c)})^2}} \exp\left\{-\frac{(y_\alpha - \mu_i^{(c)})^2}{2(\sigma_i^{(c)})^2}\right\}$$

Where the $\mu_i^{(c)}$ is the mean of the response variable y in each range $r_i^{(c)}$. The $(\sigma_i^{(c)})^2$ is the variance of the response variable y in each range $r_i^{(c)}$. Further, the $\mu^{(c)}$ satisfies a relation $\mu^{(c)}=(\mu_1^{(c)}, \ldots, \mu_m^{(c)})'$. The $(\sigma^{(c)})^2$ satisfies a relation $(\sigma^{(c)})^2=((\sigma_1^{(c)})^2, \ldots, (\sigma_m^{(c)})^2)'$.

The mathematical formula 5 represents that the mathematical formula 2 is applied for each range $r_i^{(c)}$ and that distribution of the observed data in each range is independent of that in the other ranges.

The parameter estimation block 103 firstly determines the probability density function $f_c$ of the response variable $y_{1:n}=(y_1, \ldots, y_n)'$ in the case the explanatory variable $X=(x_1, \ldots, x_n)'$ is given for each the partition candidate $R_c$ based on the mathematical formula 5.

The parameter estimation block 103 secondly determines values of the parameters $\mu$ and $\sigma^2$ giving the maximum value of a log likelihood function log $f_c$ expressed by a mathematical formula 6 as the objective estimated values.

[Mathematical Formula 6]

$$\log f_c\left(y_{1:n} \mid X, \bigcup_{i=1}^{m^{(c)}} r_i^{(c)}; \mu^{(c)}, (\sigma^{(c)})^2\right) =$$

$$\sum_{i=1}^{m^{(c)}} \sum_{x_\alpha \in r_i^{(c)}} \left( \log \frac{1}{\sqrt{2\pi(\sigma_i^{(c)})^2}} - \frac{(y_\alpha - \mu_i^{(c)})^2}{2(\sigma_i^{(c)})^2} \right)$$

Specifically, the parameter estimation block 103 estimates the objective estimated values based on mathematical formulae 7 for each partition candidate $R_c$.

[Mathematical Formula 7]

$$\hat{\mu}_i^{(c)} = \frac{\sum_{x_\alpha \in r_i^{(c)}} y_\alpha}{n_i^{(c)}}, \quad (\hat{\sigma}_i^{(c)})^2 = \frac{\sum_{x_\alpha \in r_i^{(c)}} (y_\alpha - \hat{\mu}_i^{(c)})^2}{n_i^{(c)}},$$

$$n_i^{(c)} = \#\{\alpha \mid x_\alpha \in r_i^{(c)}\}$$

===Optimum Partition Specification Block 104===

The optimum partition specification block 104 specifies an optimum partition candidate R* among the partition candidates $R_c$. Specifically, the optimum partition specification block 104 includes a third computing circuit. The third computing circuit calculates an information criterion for each partition candidate $R_c$ based on the estimated values of the mean and the variance of the response variable y outputted by the parameter management block 103. Then, the optimum partition specification block 104 specifies the partition candidate R* corresponding to the smallest information criterion as the optimum partition.

As an example of the information criterion applied to calculating by the third computing circuit, mentioned is AIC (Akaike's Information Criterion) expressed by a following mathematical formula 8. As an alternative example of the information criterion, mentioned is BIC (Bayesian Information Criterion) expressed by a mathematical formula 9. These are mentioned as examples, and any evaluation criterions which indicate model accuracy can be applied to the first exemplary embodiment.

[Mathematical Formula 8]

$$AIC_c = -\log f_c\left(y_{1:n} \mid X, \bigcup_{i=1}^{m^{(c)}} r_i^{(c)}; \hat{\mu}^{(c)}, (\hat{\sigma}^{(c)})^2\right) + m^{(c)}$$

[Mathematical Formula 9]

$$BIC_c = -\log f_c\left(y_{1:n} \mid X, \bigcup_{i=1}^{m^{(c)}} r_i^{(c)}; \hat{\mu}^{(c)}, (\hat{\sigma}^{(c)})^2\right) + \frac{m^{(c)}}{2}\log n$$

The optimum partition specification block 104 specifies the partition candidate R* corresponding to the smallest information criterion as the optimum partition based on the information criterion such as described above.

===Smoothing Block 105===

The smoothing block 105 calculates a function described below by utilizing the estimated value of the mean of the response variable y estimated with the parameter estimation block 103. The function is a smooth function representing the estimated value of the mean of the response variable y in the domain R of the explanatory variable x. Further, the smoothing block 105 calculates a function described below. The function is a smooth function representing the estimated value of the variance of the response variable y in the domain R of the explanatory variable x by utilizing the estimated value of the variance of the response variable y estimated with the parameter estimation block 103. Specifically, the smoothing block 105 includes a fourth computing circuit. The fourth computing circuit calculates the above-mentioned smooth functions based on a position and dispersion of the explanatory variable $x_\alpha$ included in each range $r_{i'}^{(*)}$ of the optimum partition R*. Where the i' is an integer which is greater than or equal to one and is less than or equal to $m^{(*)}$. For example, the fourth computing circuit of the smoothing block 105 calculates smooth functions expressed by the following mathematical formulae 10. These smooth functions are continuous functions in the domain R and are obtained by approximating the estimated values such that the estimated values of the means in respective ranges or the estimated values of variances in respective ranges are smoothly connected.

[Mathematical Formulae 10]

$$\hat{\mu}(x) = \sum_{i'=1}^{m^{(*)}} \left( \frac{w_{i'}(x)}{\sum_{j=1}^{m^{(*)}} w_j(x)} \hat{\mu}_{i'}^{(*)} \right),$$

$$\hat{\sigma}^2(x) = \sum_{i'=1}^{m^{(*)}} \left( \frac{w_{i'}(x)}{\sum_{j=1}^{m^{(*)}} w_j(x)} \hat{\sigma}_{i'}^{(*)2} \right)$$

Where variables included in the mathematical formulae 10 satisfy a relation expressed by mathematical formulae 11.

[Mathematical Formulæ 11]

$$w_{i'}(x) = \frac{1}{\sqrt{|S_{i'}|}} \exp\left\{-\frac{1}{2}(x - \bar{x}_{i'})' S_{i'}^{-1}(x - \bar{x}_{i'})\right\},$$

$$\bar{x}_{i'} = \frac{\sum_{x_\alpha \in r_{i'}^{(*)}} x_\alpha}{n_{i'}}, \quad S_{i'} = \frac{\sum_{x_\alpha \in r_{i'}^{(*)}} (x_\alpha - \bar{x}_{i'})(x_\alpha - \bar{x}_{i'})'}{n_{i'}}$$

The mathematical formulae 10 indicates that the estimated value of the mean in the response variable y and the estimated value of the variance in the response variable y are expressed by weighted means described below. The weighted mean is a mean which is calculated by weighting a parameter $w_{i'}(x)$ included in the estimated value of the mean in each ranges $r_{i'}^{(*)}$ of the optimum partition R* or the estimated value of the variance in each ranges $r_{i'}^{(*)}$ of the optimum partition R*. The mathematical formulae 11 indicates that a function $w_{i'}(x)$ representing a weight for each ranges $r_{i'}^{(*)}$ is determined based on the position of the explanatory variable $x_\alpha$ within the range ($x_\alpha \in r_{i'}^{(*)}$) and dispersion $S_{i'}$ of the explanatory variable $x_\alpha$.

Further, in the first exemplary embodiment, the position of the explanatory variable $x_\alpha$ in the range is expressed by the mean of the explanatory variable $x_\alpha$ in the range. Also, the dispersion of the explanatory variable $x_\alpha$ is expressed by the variance of the explanatory variable $x_\alpha$. These are mentioned for examples, and any other suitable indicators may be used to express the position and the dispersion of the explanatory variable $x_\alpha$.

Figure 2:
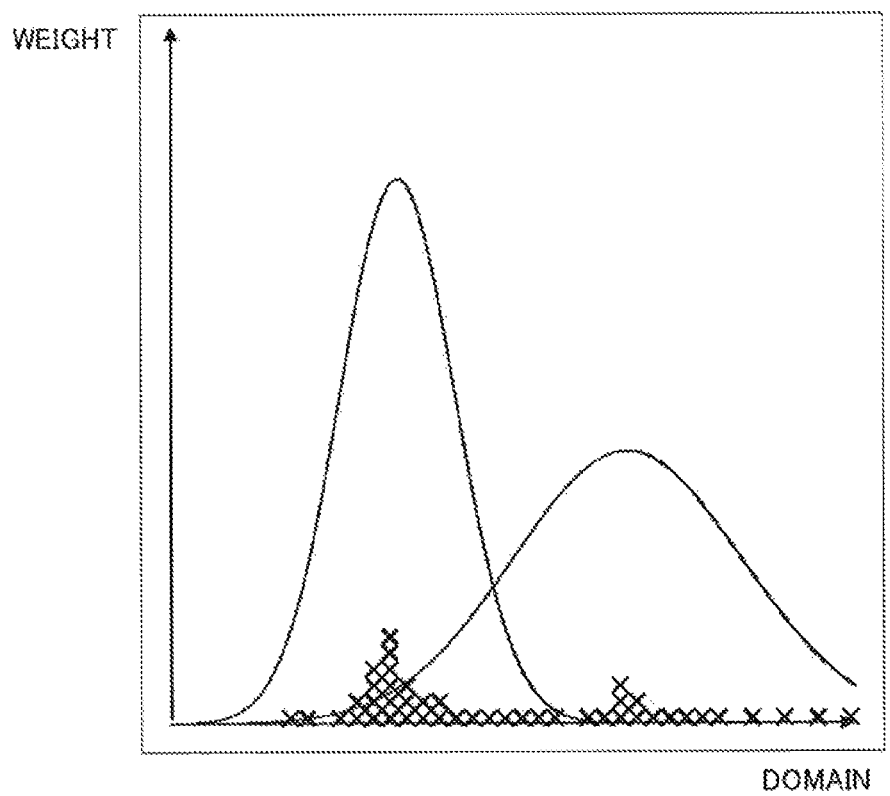
FIG. 2 is a diagram showing a relation of a function $w_i(x)$ to a position and dispersion of an explanatory variable x.

FIG. 2 shows relations of the function $w_i(x)$ to the position and the dispersion of the explanatory variable x. In FIG. 2, the mean of the explanatory variable x is used as the position of the explanatory variable x, and the variance of the explanatory variable x is used as the dispersion of the explanatory variable x. In FIG. 2, a vertical axis shows the weight of the function, and a horizontal axis shows the domain of the explanatory variable. Further, in FIG. 2, lines show the function $w_i(x)$, and a plurality of marks "×" show position of the explanatory variable in the domain.

FIG. 2 indicates that a value of the function $w_i(x)$ is larger as a value of the explanatory variable x is closer to the mean of the explanatory variable x. Also, FIG. 2 indicates that the value of the function $w_i(x)$ increases more drastically around the mean of the explanatory variable x as the variance of the explanatory variable x is smaller.

Further, the mathematical formulae 10 indicates that the estimated value of the mean of the response variable y and the estimated value of the variance of the response variable y are calculated by a calculation method similar to Kernel density estimation. As the calculation method, an analysis method using a Kernel function is mentioned, for example. Further, Kernel density estimation is one of methods for estimating the probability density function with respect to the random variable.

As has been described above, the smoothing block 105 outputs the smooth function representing the estimated value of the mean of the response variable y in the domain R of the explanatory variable x. Also, the smoothing block 105 outputs the smooth function representing the estimated value of the variance of the response variable y in the domain R of the explanatory variable x. Further, the smoothing block 105 outputs the position and the dispersion $S_i$, of the explanatory variable $x_\alpha$ ($x_\alpha \in r_i^{(*)}$) within each range $r_i^{(*)}$ and the explanatory variable $X=(x_1, \ldots, x_n)'$. Further, the smoothing block 105 may output the above-mentioned information via an output block (not shown in drawings).

The first computing circuit of the partition candidate management block 102 may execute the calculation processes by program control utilizing one or more CPU (Central Processing units) and a memory. Similarly, the second computing circuit in the parameter estimation block 103 may execute the calculation processes by program control using one or more CPU and a memory. The third computing circuit of the optimum partition specification block 104 may execute the calculation processes by program control utilizing one or more CPU and a memory. The fourth computing circuit of the smoothing block 105 may execute the calculation processes by program control using one or more CPU and a memory.

Figure 3:
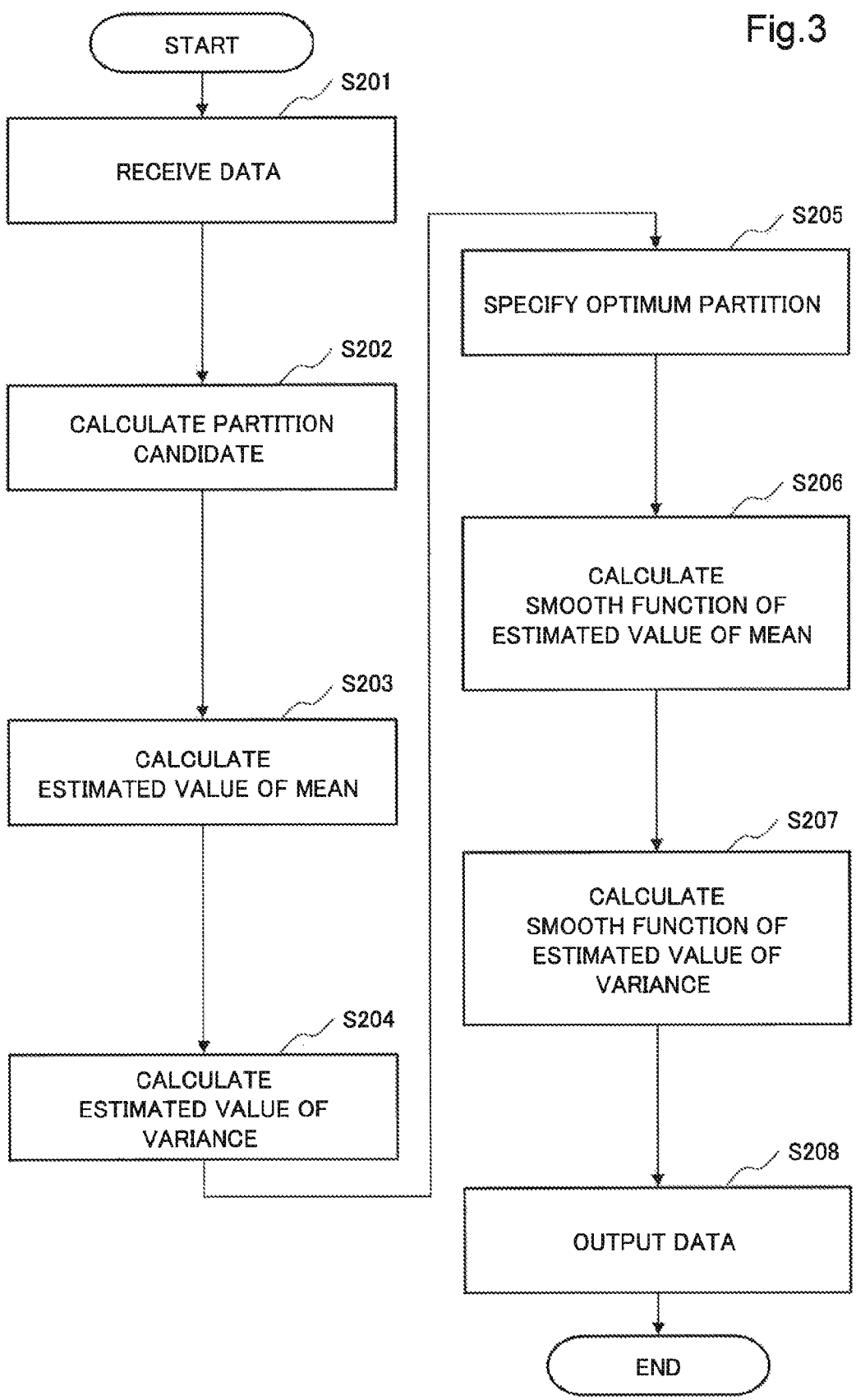
FIG. 3 is a flow chart showing operation of the information processing device in the first exemplary embodiment according to the present invention.

FIG. 3 is a flow chart showing an example of operation of the information processing device 11 of the first exemplary embodiment according to the present invention.

The input block 101 accepts n pieces of the observed data $(y_\alpha, x_\alpha)$ which is a combination of the response variable y and the explanatory variable x. The input block 101 also receives the information on the domain R of the explanatory variable x, the maximum value M for the number of partitions in the case that the domain R is partitioned and the minimum unit $\Delta x$ of each ranges (Step S201). The partition candidate management block 102 calculates the partition candidate based on the information about the domain R of the explanatory variable x, the maximum value M and the minimum unit $\Delta x$ of each ranges (Step S202).

The parameter estimation block 103 calculates the estimated value of the mean of the response variable y for each range $r_i^{(c)}$ based on the observed data $(y_\alpha, x_\alpha)$ and each partition candidate $R_c$ of the domain R (Step S203). The parameter estimation block 103 also calculates the estimated value of the variance of the response variable y for each range $r_i^{(c)}$ based on the observed data $(y_\alpha, x_\alpha)$ and each partition candidate $R_c$ of the domain R (Step S204).

The optimum partition specification block 104 calculates the information criterion for each partition candidate $R_c$ based on the estimated value of the mean of the response variable y and the estimated value of the variance of the response variable y which are outputted by the parameter management block 103. Then, the optimum partition specification block 104 specifies the partition candidate R* for which the smallest information criterion is calculated as the optimum partition (Step S205).

The smoothing block 105 calculates the smooth function representing the estimated value of the mean of the response variable y in the domain R of the explanatory variable x (Step S206). The smoothing block 105 calculates also the smooth function representing the estimated value of the variance of the response variable y in the domain R of the explanatory variable x (Step S207).

Specifically, the smoothing block 105 calculates the objective smooth functions based on the position of the explanatory variable $x_\alpha$ and the dispersion of the explanatory variable $x_\alpha$ in each range $r_i^{(*)}$ of the optimum partition R*.

The smoothing block 105 outputs the smooth function representing the estimated value of the mean of the response variable y in the domain R of the explanatory variable x. The smoothing block 105 outputs also the smooth function representing the estimated value of the variance of the response variable y in the domain R of the explanatory variable x. Further, the smoothing block 105 outputs the position of and dispersion $S_i$ of the explanatory variable $x_\alpha$ ($x_\alpha \in r_i^{(*)}$) within each range $r_i^{(*)}$ and the explanatory variable $X=(x_1, \ldots, x_n)'$ (Step S208).

The information processing device 11 of the first exemplary embodiment partitions the domain of the explanatory variable into a plurality of ranges and estimates the mean of the response variable and the variance of the response variable by a model which enables to determine the mean of the response variable and the variance of the response variable for each range by easy calculation. Accordingly, even if the mean of the response variable and the variance of the response variable are dependent on the explanatory variable taking a continuous value; the information processing device 11 of the first exemplary embodiment can easily estimate the mean of the response variable and the variance of the response variable. Further, the information processing device 11 of the first exemplary embodiment can estimate both the mean of the response variable and the variance of the response variable in the same processing step. Furthermore, in a case that the mean of the response variable and the variance of the response variable are nonlinear or discontinuous functions (in other words, in a case that they change in a complicated manner), the functions can be expressed by a combination of simple models. Therefore, the information processing device 11 of the first exemplary embodiment can estimate the mean of the response variable and the variance of the response variable easily and appropriately.

Since the information processing device 11 of the first exemplary embodiment can estimate the mean of the response variable and the variance of the response variable even if they are dependent on the explanatory variable taking a continuous value as described above, it can obtain an accurate result of the regression analysis.

For example, in a case that the explanatory variable is information representing a physical coordinate in a geometric space, the information processing device 11 of the first exemplary embodiment can accurately perform the regression analysis concerning an event where a value changes according to a value of the coordinate. In a case that the explanatory variable is information representing time, the information processing device 11 of the first exemplary embodiment can accurately perform the regression analysis concerning an event where a value changes according to the time. In particular, because of the reasons described above, the information processing device 11 of the first exemplary embodiment is applicable to even a case where data accuracy is required (for example, a case of guiding an airplane for landing).

The information processing device 11 of the first exemplary embodiment formulates the mean of the response variable and the variance of the response variable into the smooth function respectively. Accordingly, the information processing device 11 does not need complicated calculation, and thus can reduce the amount of calculation or calculation time necessary for the regression analysis.

In general regression model, the variance of the response variable y is assumed to be constant not depending on the value of the explanatory variable x. In other words, in general regression model, it is assumed that the response variable disperses uniformly (homogeneity of variance). It is reason that it is general to assume a magnitude of an error of each response variable to be constant in a case that a regression function u(x; w) relating to data subjected for the regression analysis is an appropriate function. Further, with respect to general regression model, there is a mathematical basis for the fact that estimation of the mean of the response variable and the variance of the response variable is very difficult in the case that the two parameters are dependent on the explanatory variable. Therefore, in regression analysis based on data in which the variance of the response variable is not homogeneity, it is inadequate to apply the regression model based on the uniformity of variance.

As the regression analysis method in the case that the variance of the response variable is not homogeneity, there are weighting least squares and Box-Cox transformation, for example. In these methods, an information processing device transforms data into the form satisfying the homogeneity of variance of the response variable, and uses the general regression model for the transformed data. In those methods, unless a user of the information processing device knows in advance and inputs information representing a dependence relationship between the response variable and the explanatory variable, the information processing device cannot execute the analysis. It is because, in those methods, the information processing device transforms data based on information on non-homogeneity of the variance of the response variable.

The information processing device 11 of the first exemplary embodiment does not assume the homogeneity of variance of the response variable in executing the regression analysis. Accordingly, the information processing device 11 can execute the regression analysis based on the data in which the variance of the response variable is not homogeneity. In addition, the information processing device 11 of the first exemplary embodiment also analyzes dependence itself of the variance of the response variable. Accordingly, the information processing device 11 does not need to receive information representing a dependence relationship between the response variable and the explanatory variable from a user in advance.

(Second Exemplary Embodiment)

In a second exemplary embodiment, a description will be given an example of specific operation of the information processing device 11 of the first exemplary embodiment. A configuration of the information processing device 11 in the second exemplary embodiment is similar to that of the information processing device 11 of the first exemplary embodiment, and its description will be omitted.

In the second exemplary embodiment, a description will be given an example of specific operation where the information processing device 11 estimates a variance of a signal error which is the response variable in a case that an angle of elevation is given as the explanatory variable.

Today, in order to enable highly accurate landing of an airplane, a landing guidance system using an artificial satellite such as GPS (Global Positioning System) has been studied. In order to build a safer landing guidance system, the landing guidance system is required to accurately measure a magnitude (variance) of an error of the artificial satellite signal. Further, the signal error depends largely on the angle of elevation of the artificial satellite seen from the ground.

Figure 4:
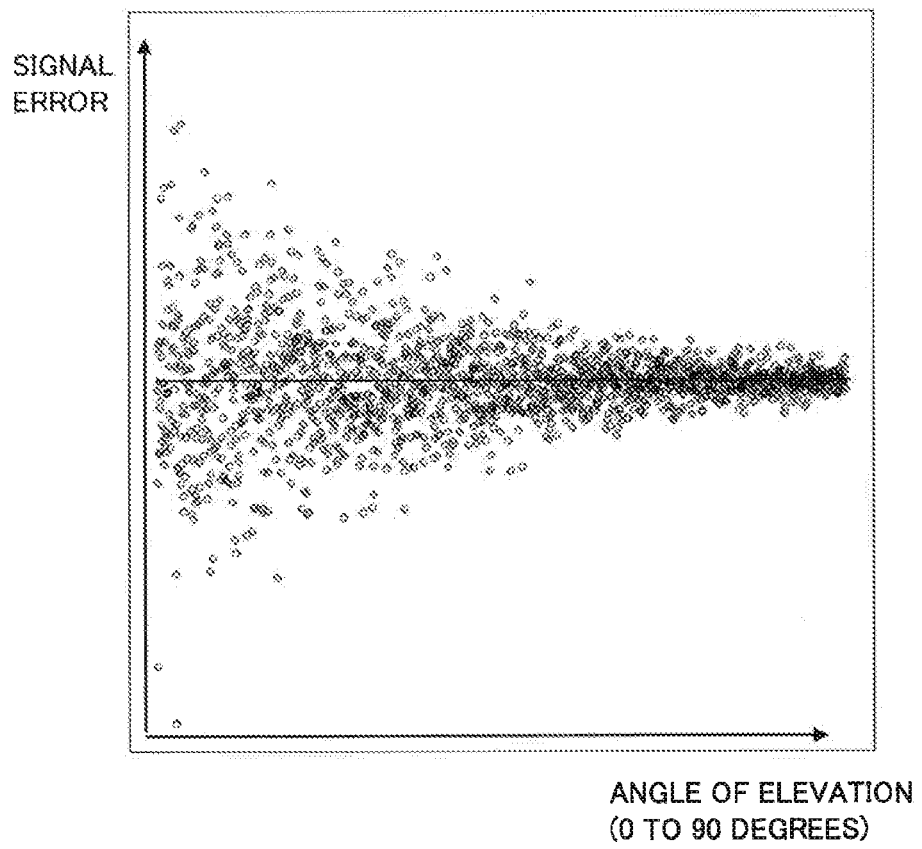
FIG. 4 is an example showing a relation between an angle of elevation and a signal error based on pseudo data generated by simulation.

FIG. 4 is a diagram showing a relation between the signal error and the angle of elevation which is obtained based on pseudo observed data generated by simulation. In FIG. 4, a vertical axis represents the signal error, and a horizontal axis represents the angle of elevation. In the second exemplary embodiment, the signal errors are normalized such that the mean is zero. Further, the angle of elevation is assumed to take a value in the range from 0 to 90 degrees.

In the case that the angle of elevation is given as the explanatory variable, the information processing device 11 of the second exemplary embodiment can estimate the magnitude (variance) of the signal error being the response variable based on the observed data.

Figure 5:
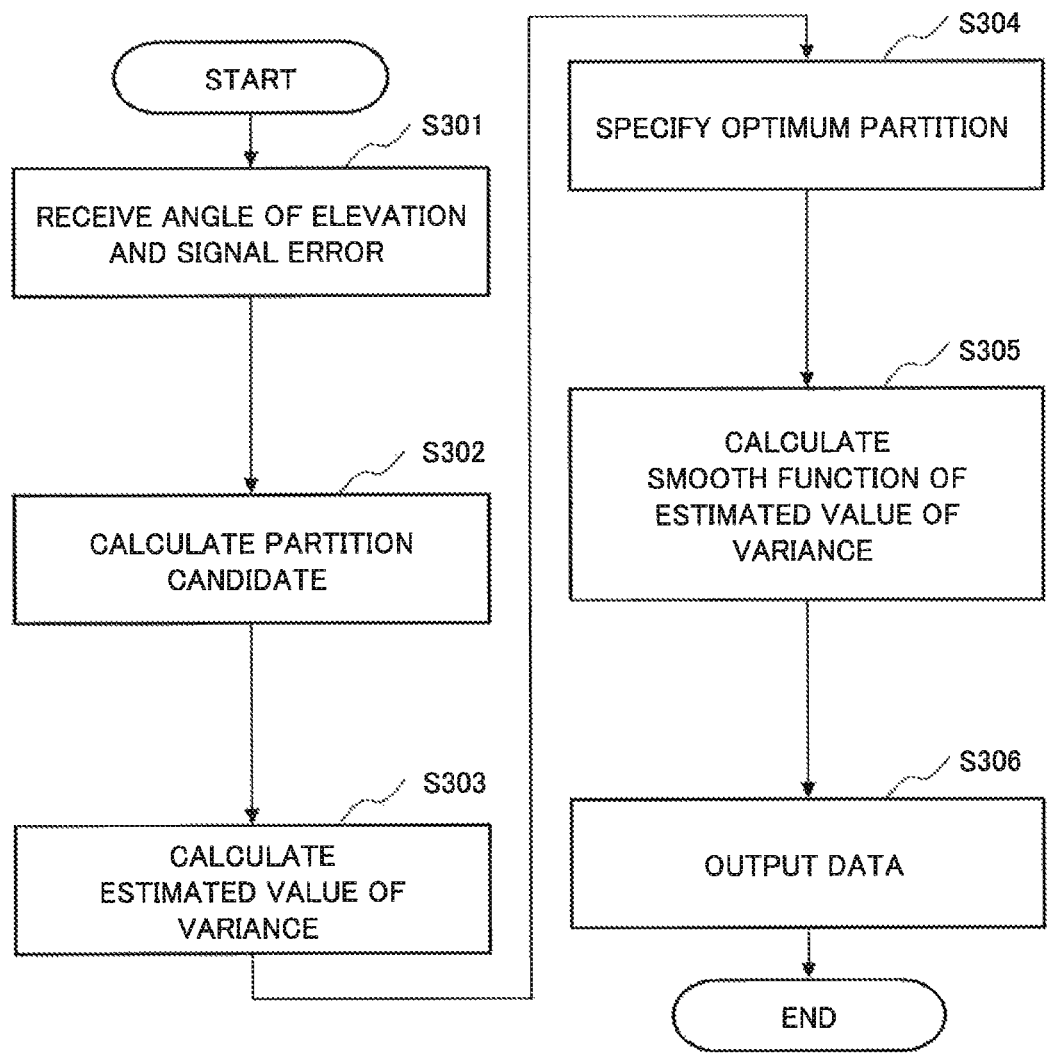
FIG. 5 is a flow chart showing operation of an information processing device in a second exemplary embodiment.

FIG. 5 is a flow chart showing operation of the information processing device 11 of the second exemplary embodiment according to the present invention.

The input block 101 receives the observed data which is a combination of information representing the angle of elevation x in a case that each artificial satellite (not shown in drawings) is seen from a receiver on the ground (ground receiver, not shown in drawings) and information representing the signal error. Further, in this second exemplary embodiment, a description will be given in the case of one ground receiver. However, the number of ground receivers is not limited to one. In a case that there are a plurality of ground receivers, one of the ground receivers performs information processing which will be described below. Alternatively, it may be possible that after each of ground receivers performs the information processing, one of the ground receivers or another device outputs one result based on results of the information processing outputted by the ground receivers.

A specific example will be described below. The input block 101 receives information described below. First, the input block 101 receives information representing the angle of elevation for each artificial satellite seen from the ground receiver. In addition, the ground receiver may be a part of components of the input block 101. Alternatively, the ground receiver may be included in a device different from the information processing device 11.

Secondly, the input block 101 receives information representing a geometric distance between each artificial satellite and the ground receiver which is measured by the ground receiver. Thirdly, the input block 101 receives information representing a pseudo distance which is calculated based on a carrier-wave phase of a GPS-signal the ground receiver receives from an artificial satellite. The input block 101 calculates a signal error y based on a difference between the geometric distance and the pseudo distance (Step S301). In this way, the input block 101 generates the observed data ($y_\alpha$, $x_\alpha$) including information representing the angle of elevation x and information representing the error y.

The input block 101 or the partition candidate management block 102 is provided with the domain R of the angle of elevation x, the maximum value M for the number of partitions in the case of partitioning the domain R of the angle of elevation x into a plurality of ranges, and the minimum unit Δx of each range by a user of the information processing device 11. In the second exemplary embodiment, R=90 degrees, M=90 and Δx=1 degree are assumed to be satisfied. The values are presented for examples and are not the only limited ones.

The partition candidate management block 102 calculates the partition candidate $R_c$ based on the information representing the domain R of the angle of elevation x, the maximum value M for the number of partitions in the case of partitioning the domain R and the minimum unit Δx of each range (Step S302).

The parameter estimation block 103 calculates the estimated value of the variance of the signal error y for each range $r_i^{(c)}$ based on the observed data $(y_\alpha, x_\alpha)$ and each partition candidate $R_c$ of the domain R (Step S303).

The optimum partition specification block 104 calculates the information criterion for each partition candidate $R_c$. Then, the optimum partition specification block 104 specifies the partition candidate R* in which the smallest information criterion is calculated as an optimum partition (Step S304).

The smoothing block 105 calculates the smooth function representing the estimated values of the variances of the signal error y in the domain R of the angle of elevation x (Step S305). Specifically, the smoothing block 105 calculates the objective smooth function based on the position of the angle of elevation $x_\alpha$ in each range $r_i^{(*)}$ of the optimum partition R* and the dispersion of the angle of elevation $x_\alpha$. The smoothing block 105 outputs the smooth function representing the estimated values of the variances of the signal error y in the domain R of the angle of elevation x. Further, the smoothing block 105 outputs the position of the angle of elevation $x_\alpha$ $(x_\alpha \in r_i^{(*)})$ in each range $r_i^{(*)}$, the dispersion $S_i$ of the angle of elevation $x_\alpha$ and the angle of elevation $X=(x_1, \ldots, x_n)'$ (Step S306). The smoothing block 105 may output these pieces of information in a format specified by a user of this information processing device 11. This format is usually in the form of a function in a specific programming language.

Figure 6:
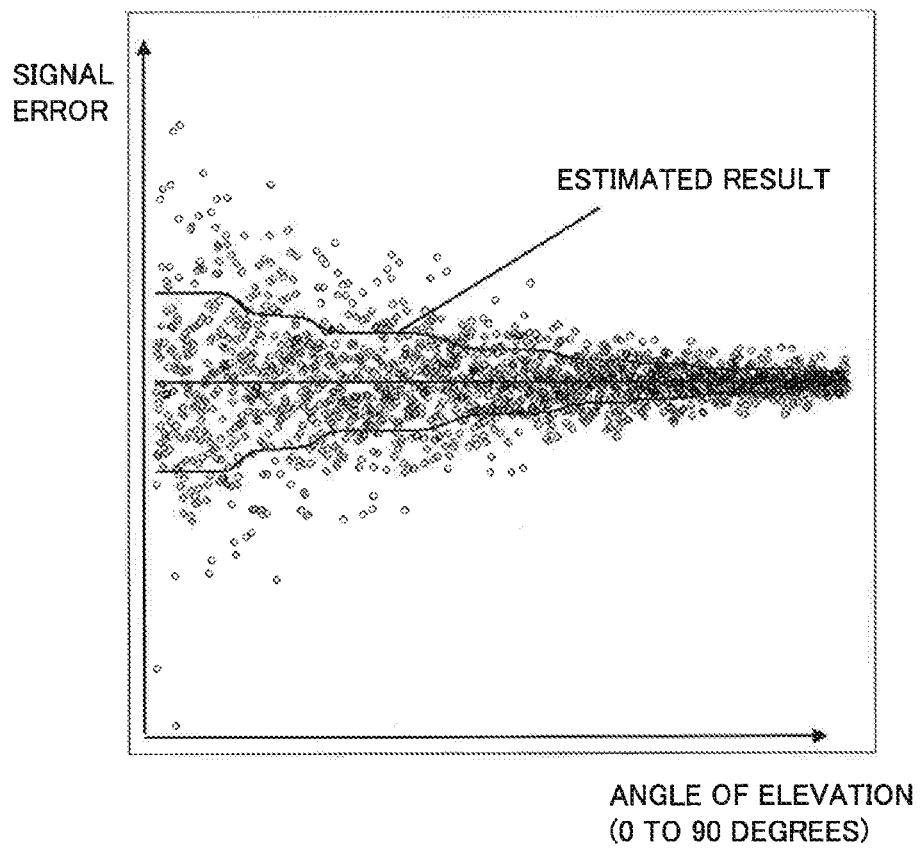
FIG. 6 is a diagram showing an example of an result in which a variance of a signal error is estimated in the second exemplary embodiment.

FIG. 6 shows an estimated result by the information processing device 11 of the second exemplary embodiment. A set of lines drawn in a line-symmetric manner about the horizontal axis in FIG. 6 corresponds to a function representing the estimated values of standard deviations (positive square roots of variance) of the signal error. FIG. 6 indicates that the variance of the signal error increases with decreasing the angle of elevation. In other words, FIG. 6 shows dependence of the signal error on the angle of elevation.

(Third Exemplary Embodiment)

Figure 7:
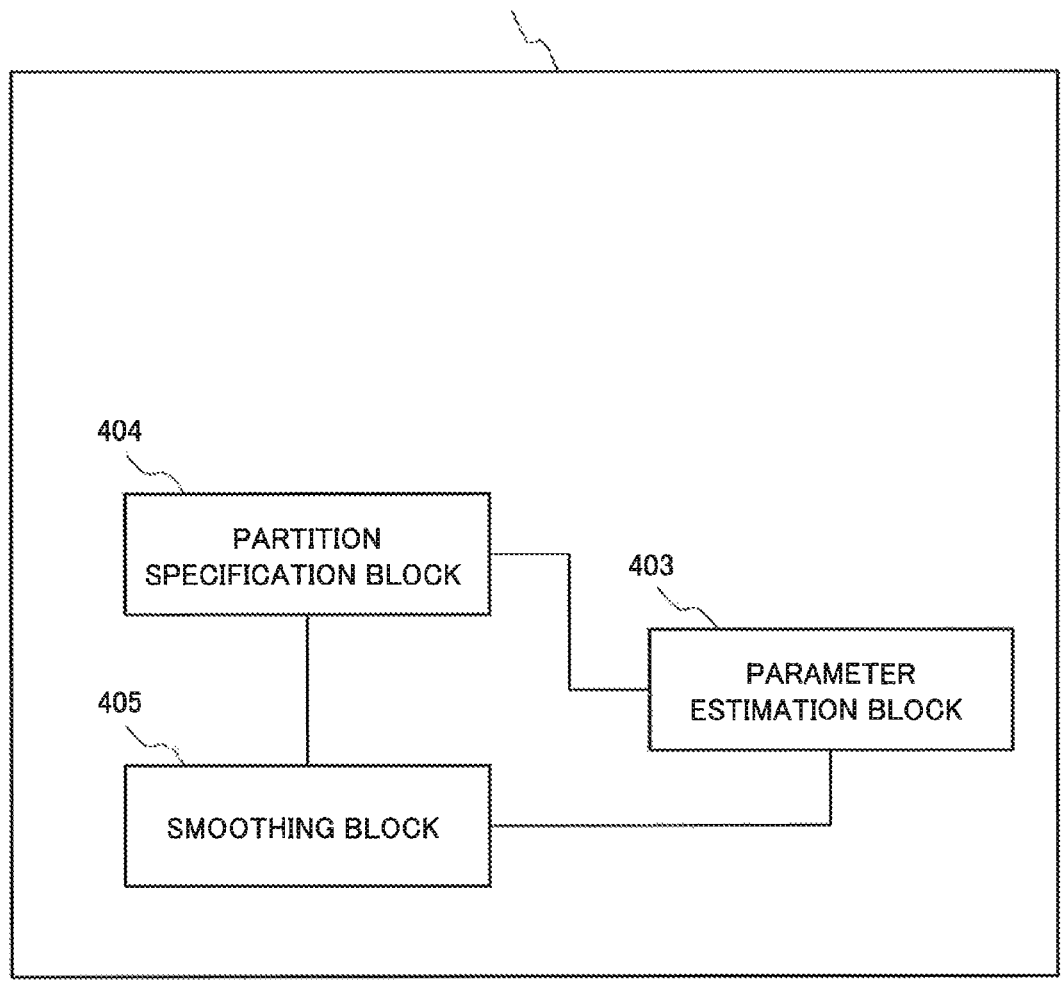
FIG. 7 is a block diagram showing a configuration of an information processing device of a third exemplary embodiment.

FIG. 7 is a block diagram showing an example of a configuration of an information processing device 41 in a third exemplary embodiment according to the present invention.

The information processing device 41 includes a parameter estimation block 403, an optimum partition specification block 404 and a smoothing block 405.

The parameter estimation block 403 is connected with the optimum partition specification block 404 and the smoothing block 405. The optimum partition specification block 404 is connected with the parameter estimation block 403 and the smoothing block 405. The smoothing block 405 is connected with the parameter estimation block 403 and the optimum partition specification block 404.

The parameter estimation block 403 calculates the mean of the response variable and the variance of the response variable based on the observed data, for each range determined based on the partition candidate being information on partitioning the domain of the explanatory variable into a plurality of ranges. The observed data is data which is the combination of the explanatory variable and the response variable observed in terms of the explanatory variable. The mean of the response variable and the variance of the response variable are dependent on the explanatory variable pairing with the response variable.

The optimum partition specification block 404 calculates the information criterion of the partition candidate based on the observed data, the mean of the response variable and the variance of the response variable calculated by the parameter estimation block 403. Then, based on the calculated information criteria, the optimum partition specification block 404 specifies the partition candidate R* as the optimum partition.

The smoothing block 405 calculates the smooth function representing the mean of the response variable in the domain of the explanatory variable by using the mean calculated by the parameter estimation block 403 for each range determined based on the partition candidate R*. Also, the smoothing block 405 calculates the smooth function representing the variance of the response variable in the domain of the explanatory variable by using the variance calculated by the parameter estimation block 403 for each range determined based on the partition candidate R*.

Operation of the information processing device 41 shown in FIG. 7 is similar to that of the information processing device 11 described in the first exemplary embodiment. The information processing device 41 partitions the domain of the explanatory variable into a plurality of ranges, and estimates the mean of the response variable and the variance of the response variable for each the ranges by using a model which enables to specify the mean of the response variable and the variance of the response variable by easy calculation. Accordingly, the information processing device 41 of the third exemplary embodiment can obtain the same effect as that of the information processing device 11 of the first exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, with respect to each block in each of the exemplary embodiments of the present invention, the functions can be realized not only by hardware but also by a computer and a program (a computer program). Such the program is recorded in a computer-readable storing medium (storage medium) such as a magnetic disk and a semiconductor memory and is thereby provided, and it is read from the computer-readable storing medium to a computer at the time of booting the computer or the like. By controlling operation of the computer, this read program can enable the computer to have the above-described functions as the blocks in each of the exemplary embodiments.

This application is based upon and claims the benefit of priority from Japanese patent application No. 2009-284304, filed on Dec. 15, 2009, the disclosure of which is incorporated herein in its entirety by reference.

[Industrial Applicability]

The information processing devices according to the respective exemplary embodiments can be applied to the regression analysis for estimating the mean of the response variable and the variance of the response variable in the case that the mean of the response variable and the variance of the response variable are dependent on the explanatory variable.

In the case that the explanatory variable is information representing the physical coordinate in the geometric space, the information processing devices according to the respective exemplary embodiments can be applied to, for example, the following technology areas.

- analysis of radio wave intensity on a cellular phone
- error analysis of a sensor by wireless
- component analysis regarding nature of soil (soil components)
- analysis of water quality data in a river and a sea
- analysis of a distribution of land prices
- investigation on variation of traffic density In a case that the explanatory variable is information representing time, the information processing devices according to the respective exemplary embodiments can be applied to, for example, the following technology areas.

- analysis of temperature and hardness of parts in a manufacturing process of an industrial product
- analysis of acceleration from the time of a crash in a crash test of a car or a motorcycle

REFERENCE SIGNS LIST 11 information processing device
41 information processing device
101 input block
102 partition candidate management block
103 parameter estimation block
104 partition specification block
105 smoothing block
403 parameter estimation block
404 partition specification block
405 smoothing block

The invention claimed is:

1. An information processing device, comprising:
a memory storing instructions; and
one or more processors configured to process the instructions to:
calculate a mean and a variance of a response variable for each range which is determined based on a partition candidate being information on partitioning a domain of an explanatory variable into a plurality of ranges based on observed data including information representing the explanatory variable and information representing the response variable being an observed value in terms of the explanatory variable and the mean and the variance are dependent on the explanatory variable;
select a specific partition candidate among a plurality of the partition candidates by using an information criterion which is calculated based on the observed data and the calculated mean and variance of the response variable; and
calculate a smooth function representing the variance of the response variable in the domain of the explanatory variable and a smooth function representing the mean of the response variable in the domain of the explanatory variable based on the mean and the variance calculated for each range determined based on the specific partition candidate.

2. The information processing device according to claim 1, wherein in the calculating the mean and the variance of the response variable, the mean and the variance of each range are of normal distribution and the mean and the variance of the response variable are calculated for the each range determined by the partition candidate.

3. The information processing device according to claim 1, wherein in the selecting the specific partition candidate, the partition candidate in which the calculated information criterion is the smallest is selected as the specific partition candidate.

4. The information processing device according to claim 1, wherein in the calculating the smooth function, the smooth function is calculated based on a position of the explanatory variable in each range and the calculated mean and variance for each range determined by using the specific partition candidate.

5. The information processing device according to claim 1, wherein in the calculating the smooth function, the smooth function is calculated based on dispersion of the explanatory variable in each range and the calculated mean and variance for each range determined by using the specific partition candidate.

6. The information processing device according to claim 1, wherein in the calculating the smooth function, a Kernel function is calculated with respect to the calculated mean and variance for each range determined based on the specific partition candidate, and the smooth function is calculated based on the Kernel function.

7. The information processing device according to claim 1, wherein the one or more processors are further configured to process the instructions to:
calculate the partition candidate based on the observed data, information representing the domain of explanatory variable, the maximum value for the number of partitions in a case of partitioning the domain of the explanatory variable into a plurality of ranges and the minimum block for each range, wherein
in the calculating the mean and the variance of the response variable, the mean and the variance of the response variable are calculated for each range determined based on the specific partition candidate.

8. The information processing device according to claim 1, wherein the information criterion is either of Akaike's information criterion and Bayesian information criterion.

9. An information processing device, comprising:
parameter estimation means for calculating a mean and a variance of a response variable for each range which is determined based on a partition candidate being information on partitioning a domain of an explanatory variable into a plurality of ranges based on observed data including information representing the explanatory variable and information representing the response variable being an observed value in terms of the explanatory variable and the mean and the variance are dependent on the explanatory variable;
optimum partition specification means for selecting a specific partition candidate among a plurality of the partition candidates by using an information criterion which is calculated based on the observed data and the calculated mean and variance of the response variable; and
smoothing means for calculating a smooth function representing the variance of the response variable in the domain of the explanatory variable and a smooth function representing the mean of the response variable in the domain of the explanatory variable based on the mean and the variance calculated for each range determined based on the specific partition candidate.

10. A method of processing information, comprising:
calculating, using one or more processors, a mean and a variance of a response variable for each range which is determined based on a partition candidate being information on partitioning a domain of an explanatory variable into a plurality of ranges based on observed data including information representing the explanatory variable and information representing the response variable being an observed value in terms of the explanatory variable and the mean and the variance are dependent on the explanatory variable;

selecting, using the one or more processors, a specific partition candidate among a plurality of the partition candidates by using an information criterion which is calculated based on the observed data and the calculated mean and variance of the response variable; and calculating, using the one or more processors, a smooth function representing the variance of the response variable in the domain of the explanatory variable and a smooth function representing the mean of the response variable in the domain of the explanatory variable based on the mean and the variance calculated for each range determined based on the specific partition candidate.

11. A non-transitory storage medium that stores a computer program to enable a computer to execute a process, the process comprising:

a parameter estimation process that calculates a mean and a variance of a response variable for each range which is determined based on a partition candidate being information on partitioning a domain of an explanatory variable into a plurality of ranges based on observed data including information representing the explanatory variable and information representing the response variable being an observed value in terms of the explanatory variable and the mean and the variance are dependent on the explanatory variable;

an optimum partition specification process that selects a specific partition candidate among a plurality of the partition candidates by using an information criterion which is calculated based on the observed data and the calculated mean and variance of the response variable; and a smoothing process that calculates a smooth function representing the variance of the response variable in the domain of the explanatory variable and a smooth function representing the mean of the response variable in the domain of the explanatory variable based on the mean and the variance calculated for each range determined based on the specific partition candidate.

12. An information processing device, comprising:

a memory storing instructions; and one or more processors configured to process the instructions to:

input observed data including information representing an explanatory variable and information representing an response variable being an observed value in terms of the explanatory variable and the mean and the variance are dependent on the explanatory variable;

calculate a mean and a variance of the response variable for each range which is determined based on a partition candidate being information on partitioning a domain of the explanatory variable into a plurality of ranges based on the input observed data;

select a specific partition candidate among a plurality of the partition candidates by using an information criterion which is calculated based on the observed data and the calculated mean and variance of the response variable;

transform from the input obtained data to a first smooth function representing the variance of the response variable in the domain of the explanatory variable and a second smooth function representing the mean of the response variable in the domain of the explanatory variable based on the mean and the variance calculated for each range determined based on the specific partition candidate; and output the first smooth function and the second smooth function.

* * * * *